US011865847B2

(12) United States Patent
Nakazawa et al.

(10) Patent No.: US 11,865,847 B2
(45) Date of Patent: Jan. 9, 2024

(54) LIQUID DISCHARGE APPARATUS

(71) Applicant: BROTHER KOGYO KABUSHIKI KAISHA, Nagoya (JP)

(72) Inventors: Fumio Nakazawa, Okazaki (JP); Yoshinori Osakabe, Seto (JP); Taichi Shirono, Nagoya (JP); Sosuke Kuroyanagi, Nishio (JP)

( * ) Notice: Subject to any disclaimer, the term of this patent is extended or adjusted under 35 U.S.C. 154(b) by 122 days.

(21) Appl. No.: 17/690,350

(22) Filed: Mar. 9, 2022

(65) Prior Publication Data

US 2022/0314634 A1 Oct. 6, 2022

(30) Foreign Application Priority Data

Mar. 31, 2021 (JP) ................................ 2021-060336

(51) Int. Cl.
*B41J 2/175* (2006.01)

(52) U.S. Cl.
CPC ....... *B41J 2/17596* (2013.01); *B41J 2/17509* (2013.01); *B41J 2/17556* (2013.01); *B41J 2/17566* (2013.01)

(58) Field of Classification Search
CPC . B41J 2/14; B41J 2/175; B41J 2/17503; B41J 2/17506; B41J 2/17509; B41J 2/17513; B41J 2/1754; B41J 2/17556; B41J 2/17566; B41J 2/17596; B41J 2002/17569
See application file for complete search history.

(56) References Cited

U.S. PATENT DOCUMENTS 6,048,055 A * 4/2000 Hakkaku .............. B41J 2/17523 347/85
8,020,983 B2 * 9/2011 Nishimori ............ B41J 2/17596 347/7
2016/0121615 A1 * 5/2016 Igarashi .............. B41J 2/17553 347/85

FOREIGN PATENT DOCUMENTS

JP 55-65560 A 5/1980
JP 2002-321386 A 11/2002

* cited by examiner

*Primary Examiner* — Anh T Vo
(74) *Attorney, Agent, or Firm* — Merchant & Gould P.C.

(57) ABSTRACT

There is provided a liquid discharge apparatus including: a head having a nozzle; a tank; a gas channel; a valve unit; a memory; and a controller. The controller is configured to execute: making of the valve unit to be in an open state, under a condition that a count value indicating an amount of a liquid discharged from the nozzle has reached an opening threshold value ΔV. The opening threshold value ΔV is represented by: $\Delta V \leq (Vtmax - Vi) \times Pm/(P - Pm)$. Note that Vtmax represents a volume of the tank, Vi represents the maximum amount of the liquid storable in the tank, P represents an atmospheric pressure, and Pm represents a meniscus-withstanding pressure of the liquid formed in the nozzle.

8 Claims, 11 Drawing Sheets

LIQUID DISCHARGE APPARATUS

CROSS REFERENCE TO RELATED APPLICATION

The present application claims priority from Japanese Patent Application No. 2021-060336, filed on Mar. 31, 2021, the disclosure of which is incorporated herein by reference in its entirety.

BACKGROUND

The present disclosure relates to a liquid discharge apparatus having a head which discharges a liquid supplied from a tank.

As an apparatus which discharges an ink stored in a tank from a nozzle so as to perform recording of an image, an ink-jet pen is publicly known. In a certain publicly known ink-jet pen, a liquid surface of the ink stored in an ink cartridge is positioned above an opening of the nozzle. In the ink cartridge, a gas layer is not communicated with outside, or a valve is provided on a gas channel which communicates the gas layer with the outside.

SUMMARY

In a case that the gas layer of the ink cartridge is not communicated with the outside and that the ink is consumed, the pressure of the gas layer is thereby lowered. As a result, there is a fear that a meniscus formed in the opening of the nozzle might be broken or destroyed. The pressure of the gas layer of the ink cartridge is lowered more easily as the volume of the gas layer is smaller. However, in a case that the volume of the gas layer is made great in the ink cartridge, the ink cartridge becomes large, which results in the increase in the size of the apparatus.

The present disclosure has been made in view of the above-described situation, and an object of the present disclosure is to provide a mechanism which is configured to recover any lowering in the pressure inside a tank accompanying with discharge of a liquid from a nozzle, without making the size of the apparatus to be large.

According to an aspect of the present disclosure, there is provided a liquid discharge apparatus including: a head having a nozzle; a tank; a gas channel, a valve unit, a memory, and a controller. In the tank, a height of a liquid surface, in a case that the tank stores a maximum amount of a liquid, is positioned above an opening of the nozzle. The gas channel is configured to communicate a gas layer of the tank with outside of the tank, via an atmosphere opening port which is opened to the outside. The valve unit is configured to open or close the atmosphere opening port or the gas channel. The memory is configured to store an opening threshold value ΔV. The controller is connected to the memory and is configured to control the valve unit. The controller is configured to execute: counting of a count value indicating an amount of the liquid discharged from the nozzle in a case that the valve unit is in a close state in which the valve unit closes the atmosphere opening port or the gas channel; and making of the valve unit to be in an open state in which the valve unit opens the atmosphere opening port or the gas channel, under a condition that the count value has reached the opening threshold value ΔV.

The opening threshold value ΔV is represented by:

$$\Delta V \leq (Vt\max - Vi) \times Pm/(P - Pm).$$

Note that Vtmax represents a volume of the tank, Vi represents the maximum amount of the liquid storable in the tank, P represents an atmospheric pressure, and Pm represents a meniscus-withstanding pressure of the liquid formed in the nozzle.

According to the liquid discharge apparatus, since the pressure of the gas inside the tank is made to be the atmospheric pressure at an appropriate timing, while making the volume of the tank be small, it is possible to stably discharge the liquid from the nozzle.

According to the present disclosure, it is possible to recover any lowering in the pressure inside the tank accompanying with discharge of the liquid from the nozzle, without making the size of the apparatus to be large.

BRIEF DESCRIPTION OF THE DRAWINGS

FIGS. 5A and 5B are each a view for explaining an operation of a valve unit 91, wherein FIG. 5A is a view depicting the valve unit 91 in a close state, and FIG. 5B is a view depicting the valve unit 91 in an open state.

FIGS. 7A and 7B are each a view schematically depicting a state of a gas layer of a tank 80, wherein FIG. 7A is a view depicting a state before an image recording, and FIG. 7B is a view depicting a state after the image recording.

FIGS. 8A and 8B are each a view depicting a range of an opening threshold value ΔV and a volume Vtmax of the tank 80, wherein FIG. 8A is a view depicting the range in a case that an amount of an ink 99 is made to be 4.2 mL, and FIG. 8B is a view depicting the range in a case that the amount of the ink 99 is made to be 12.5 mL.

DETAILED DESCRIPTION

Figure 1:
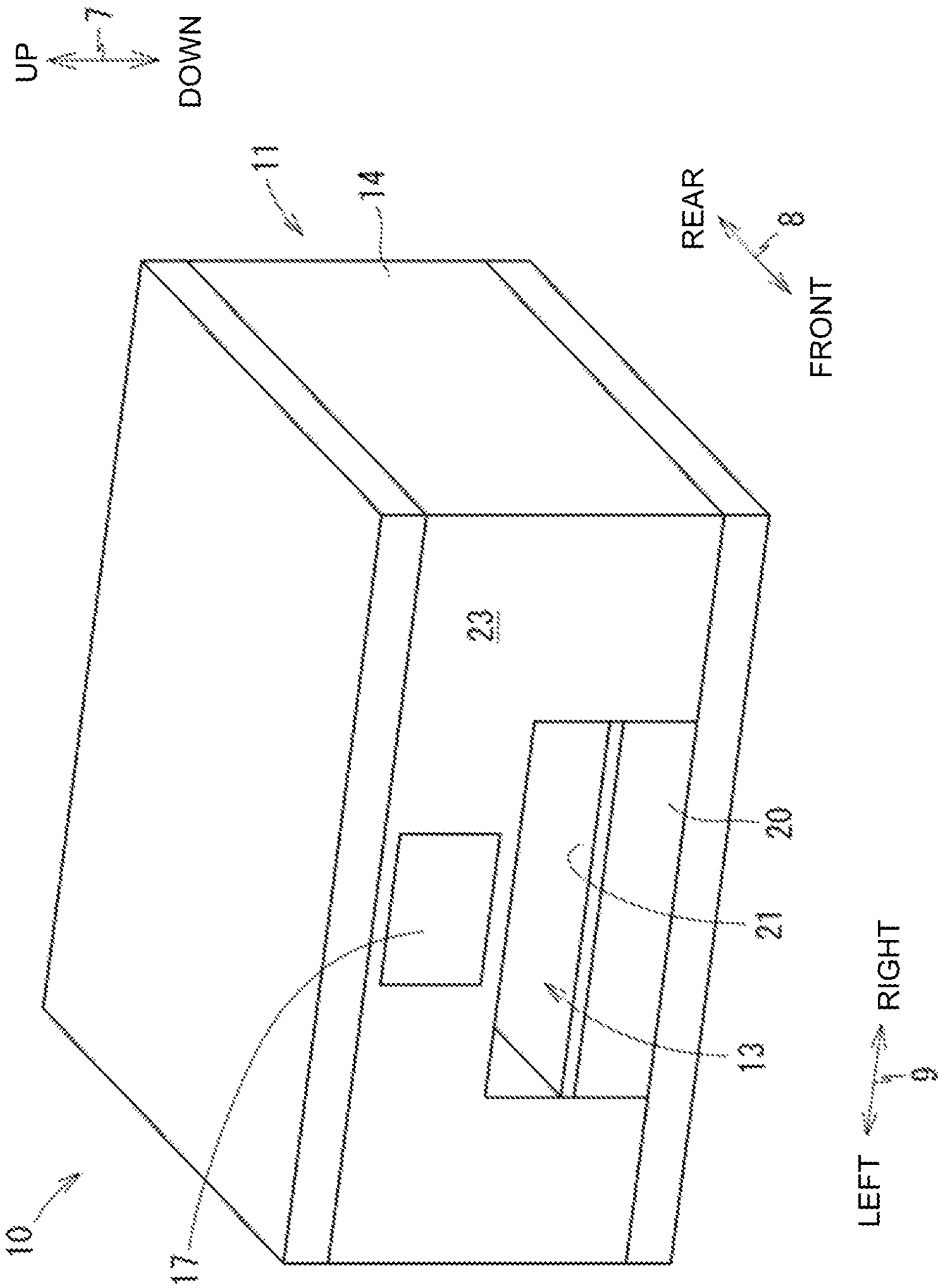
FIG. 1 is a perspective view of a multifunction peripheral 10.

In the following, an embodiment of the present disclosure will be explained. Note that the embodiment which is to be explained below is merely an example of the present disclosure; it is needless to say that the embodiment of the present disclosure can be appropriately changed without changing the gist of the present disclosure. Furthermore, in the following explanation, an up-down direction 7 is defined, with a state in which a multifunction peripheral 10 is usably installed (the state of FIG. 1) as the reference; a front-rear direction 8 is defined, with a side on which an opening 13 is provided is defined as a front surface 23; and a left-right direction 9 is defined, with the multifunction peripheral 10 as seen from the front side. The up-down direction 7, the front-rear direction 8, and the left-right direction 9 are orthogonal to one another.

[Overall Configuration of Multifunction Peripheral 10]

As depicted in FIG. 1, the multifunction peripheral 10 (an example of a "liquid discharge apparatus") has a casing 14 which has a substantially rectangular parallelepiped shape. A printer part 11 is provided at a lower part of the casing 14. The multifunction peripheral 10 has a variety of kinds of functions such as a facsimile function, a print function, etc. The multifunction peripheral 10 has a function, as the print function, of recording an image on one surface of a sheet 12 (paper sheet 12; see FIG. 2) in an ink-jet system. Note that the multifunction peripheral 10 may also be configured to record an image on both surfaces of the sheet 12. An operating part 17 is provided on an upper part of the casing 14. The operating part 17 includes a button configured to be operated for instructing the image recording, for performing a variety of kinds of settings, etc., a liquid crystal display configured to display a variety of kinds of information thereon, and the like. In the embodiment, the operating part 17 includes a touch panel having both of the function of the button and the function of the liquid crystal display.

Figure 2:
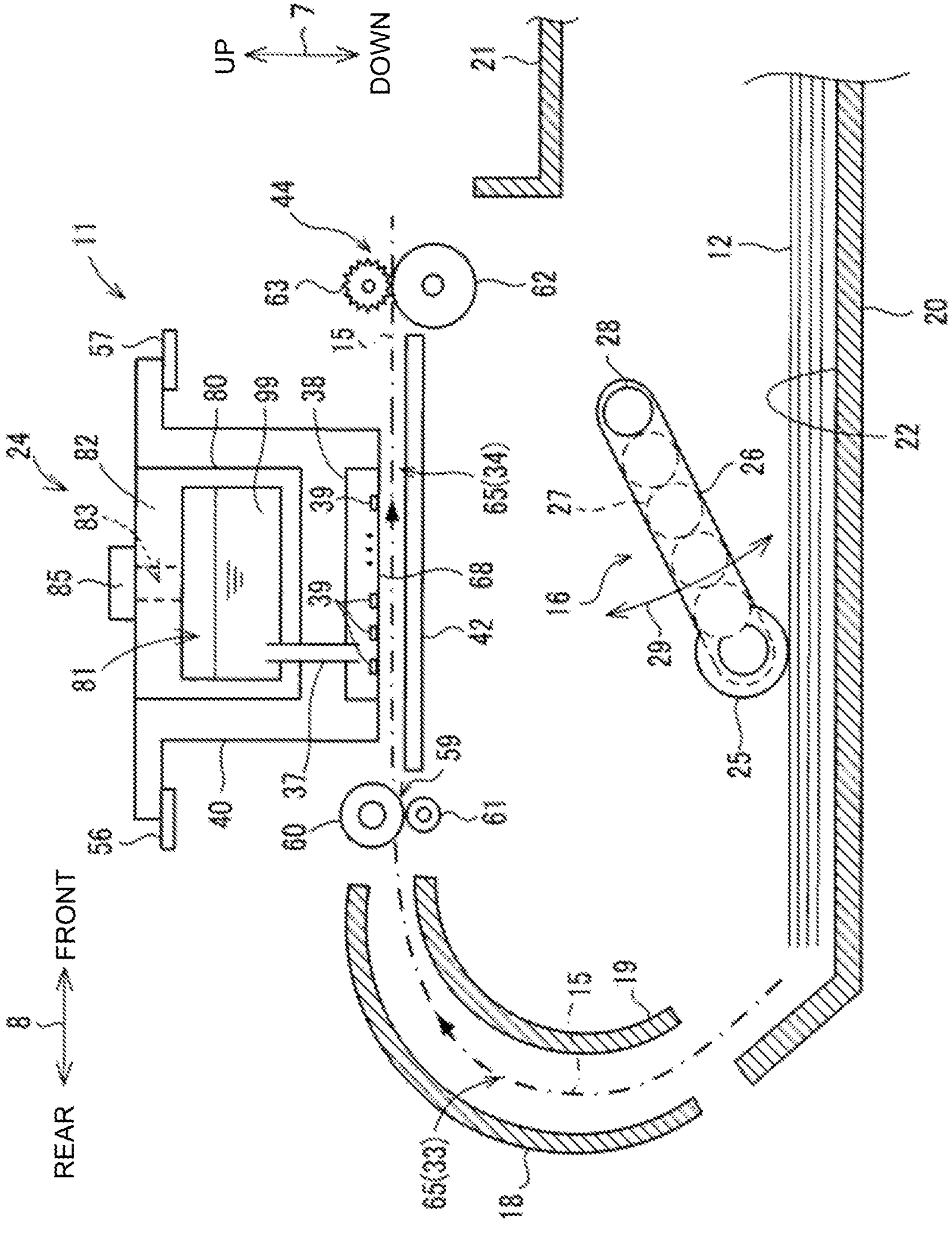
FIG. 2 is a vertical cross-sectional view schematically depicting the internal structure of a printer part 11.

As depicted in FIG. 2, the printer part 11 has a feed tray 20, a feeding part 16, an outer guide member 18, an inner guide member 19, a conveying roller pair 59, a discharging roller pair 44, a platen 42, a recording part 24, an encoder 35 (see FIG. 4), a rotary encoder 75 (see FIG. 4), a controller 130 (see FIG. 4) and a memory 140 (see FIG. 4) which are arranged inside the casing 14. In the inside of the casing 14, a variety of kinds of state sensors (not depicted in the drawings), which are configured to detect the state of the multifunction peripheral 10 and to output a signal in accordance with a result of detection, are arranged.

[Feed Tray 20]

As depicted in FIG. 1, an opening 13 is formed in the front surface 23 of the printer part 11. The feed tray 20 is insertable and removable with respect to the casing 14 via the opening 13, by moving in the front-rear direction 8. The feed tray 20 is movable between a feeding position (a position depicted in FIGS. 1 and 2) at which the feed tray 20 is installed in the casing 14, and a non-feeding position at which the feed tray 20 is removed (detached) from the casing 14. The feed tray 20 is inserted rearward with respect to the casing 14 to be moved to the feeding position, and the feed tray 20 is pulled frontward with respect to the casing 14 to be moved to the non-feeding position.

The feed tray 20 is a member having a box-like shape of which upper part is opened, and is configured to store a sheet 12. As depicted in FIG. 2, a plurality of pieces of the sheet 12 are supported by a bottom plate 22 of the feed tray 22 in a state that the sheets 12 are overlaid on each other. The discharge tray 21 is arranged at a location which is above a front part of the feed tray 20. A sheet 12 on which image recording has been performed by the recording part 24 and which is discharged is supported by an upper surface of the discharge tray 21. In a case that the feed tray 20 is at the feeding position, the sheet 12 supported by the feed tray 20 is allowed to be fed to a conveying route 65.

[Feeding Part 16]

As depicted in FIG. 2, the feeding part 16 is arranged at a location below the recording part 24 and above the bottom plate 22 of the feed tray 20. The feeding part 16 is provided with a feeding roller 25, a feeding arm 26, a driving transmitting mechanism 27 and a shaft 28. The feeding roller 25 is supported rotatably at a forward end part of the feeding arm 26. The feeding arm 26 rotates in a direction of an arrow 29, with the shaft 28 provided on a base part of the feeding arm 26 as the center of rotation. With this, the feeding roller 25 is capable of making contact with and separating away from the feed tray 20 or the sheet 12 which is supported by the feed tray 20.

The feeding roller 25 rotates by a driving force, of a feeding motor 102 (see FIG. 4), which is transmitted to the feeding roller 25 by the driving transmitting mechanism 27 constructed of a plurality of gears meshed with each other. With this, among the sheets 12 supported by the bottom plate 22 of the feed tray 20 at the feeding position, an uppermost sheet 12 which makes contact with the feeding roller 25 is fed to the conveying route 65. Note that the driving transmitting mechanism 27 is not limited to or restricted by the aspect in which the plurality of gears are meshed with each other; for example, the driving transmitting mechanism 27 may be a belt which is stretched between the shaft 28 and the shaft of the feeding roller 25.

[Conveying Route 65]

As depicted in FIG. 2, the conveying route 65 is extended from a rear end part of the feed tray 20. The conveying route 65 is provided with a curved part 33 and a straight part 34. The curved part 33 extends toward the upper side while making a U-turn from the rear side to the front side. The straight part 34 extends substantially along the front-rear direction 8.

The curved part 33 is formed by the outer guide member 18 and the inner guide member 19 which face or are opposite to each other, with a predetermined spacing distance therebetween. The outer guide member 18 and the inner guide member 19 are provided to extend in the left-right direction 9. At a position wherein the recording part 24 is arranged, the straight part 34 is formed by the recording part 24 and the platen 42 which face each other with a predetermined spacing distance therebetween.

The sheet 12 supported by the feed tray 20 is conveyed in the curved part 33 by the feeding roller 25, and reaches the conveying roller pair 59. The sheet 12 pinched or held by the conveying roller pair 59 is conveyed frontward in the straight part 34 toward the recording part 24. The recording part 24 records an image on the sheet 12 which has reached a location immediately below the recording part 24. The sheet 12 having the image recorded thereon is conveyed frontward in the straight part 34, and is discharged (exhausted) to the discharge tray 21. As described above, the sheet 12 is conveyed along a conveying orientation 15 which is indicated by an arrow of an alternate long and short dash line in FIG. 2.

[Conveying Roller Pair 59 and Discharge Roller Pair 44]

As depicted in FIG. 2, the conveying roller pair 59 is arranged in the straight part 34. The discharge roller pair 44 is arranged, in the straight part 34, on the downstream side in the conveying orientation 15 with respect to the conveying roller pair 59.

The conveying roller pair 59 is provided with a conveying roller 60 and a pinch roller 61 which is arranged at a location below the conveying roller 60 so as to face the conveying roller 60. The pinch roller 61 is pressed toward the conveying roller 60 by an elastic member (not depicted in the drawings) such as a coil spring, etc. The conveying roller pair 59 is capable of pinching or holding the sheet 12 therebetween.

The discharging roller pair 44 is provided with a discharging roller 62 and a spur roller 63 which is arranged at a location above the discharging roller 62 so as to face the discharging roller 62. The spur roller 63 is pressed toward the discharging roller 62 by an elastic member (not depicted in the drawings) such as a coil spring, etc. The discharging roller pair 44 is capable of pinching or holding the sheet 12 therebetween.

Figure 4:
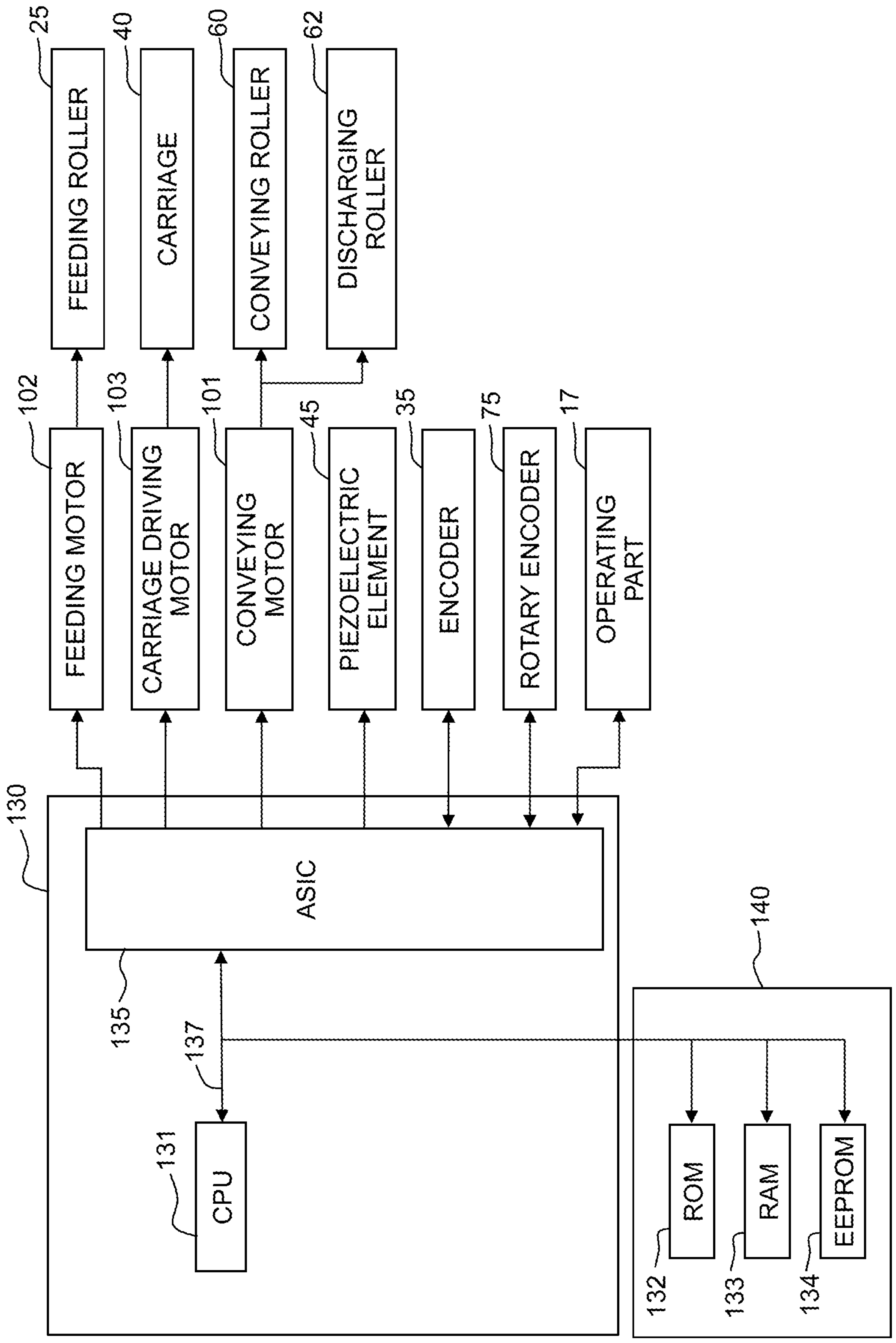
FIG. 4 is a functional block diagram of the multifunction peripheral 10.

The conveying roller 60 and the discharging roller 62 rotate in a case that a driving force is applied to the conveying roller 60 and the discharging roller 62 from the conveying motor 101 (see FIG. 4). In a case that the conveying roller 60 rotates in a state that the sheet 12 is pinched by the conveying roller pair 59, the sheet 12 is conveyed in the conveying orientation 15 by the conveying roller pair 59, and is conveyed onto the platen 42. In a case that the discharging roller 62 rotates in a state that the sheet 12 is pinched by the discharging roller pair 44, the sheet 12 is conveyed in the conveying orientation 15 by the discharging roller pair 44, and is discharged onto the discharge tray 21. Note that a common motor may be used as the conveying motor 101 and the feeding motor 102. In such a case, there is provided a configuration wherein a driving transmitting route from the common motor to each of the rollers is switchable.

Note that a mechanism or member configured to convey the sheet 12 is not limited to the roller pairs as described above. For example, it is allowable that a conveying belt is arranged, instead of the conveying roller pair 59 and the discharging roller pair 44.

[Platen 42]

As depicted in FIG. 2, the platen 42 is arranged in the straight part 34 of the conveying route 65. The platen 42 faces the recording part 24 in the up-down direction 7. The platen 42 supports the sheet 12 which is conveyed in the conveying route 65 from therebelow. The sheet 12 which is conveyed in the conveying route 65 passes an area between a right end and a left end of the platen 42 in the left-right direction (hereinafter referred to as a "medium passing area").

[Recording Part 24]

As depicted in FIG. 2, the recording part 24 is arranged at a location above the platen 42 so as to face the platen 42. The recording part 24 is provided with a carriage 40, a head 38 and a tank 80.

The carriage 40 is supported to be movable in the left-right direction 9 which is orthogonal to the conveying orientation 15, by two guide rails 56 and 57 which are arranged in the front-rear direction 8 with a spacing distance therebetween. The carriage 40 is movable, in the left-right direction 9, from the right side with respect to the medium passing area to the left side with respect to the medium passing area. Note that the moving direction of the carriage 40 is not limited to the left-right direction 9, and the moving direction may be a direction crossing the conveying orientation 15.

The guide rail 56 is arranged on the upstream side in the conveying orientation 15 with respect to the head 38. The guide rail 57 is arranged on the downstream side in the conveying orientation 15 with respect to the head 38. The guide rails 56 and 57 are supported by a pair of side frames (not depicted in the drawings) which are arranged, in the left-right direction 9, at the outside of the straight part 34 of the conveying route 65. The carriage 40 is moved in a case that a driving force is applied to the carriage 40 from a carriage driving motor 103 (see FIG. 4).

The encoder 35 (see FIG. 4) is arranged in the guide rail 56 or the guide rail 57. The encoder 35 is provided with an encoder strip extending in the left-right direction 9, and an optical sensor which is provided, on the carriage 40, at a location facing the encoder strip. A pattern, in which light transmitting parts each configured to allow a light to transmit therethrough and light shielding parts each configured to shield the light are alternately arranged at an equal pitch therebetween in the left-right direction 9, is formed or indicated in the encoder strip. The optical sensor detects the light transmitting parts and the light shielding parts, thereby detecting a pulse signal. The pulse signal is a signal in accordance with the position in the left-right direction 9 of the carriage 40. The pulse signal is outputted to the controller 130 (see FIG. 4).

The head 38 is supported by the carriage 40. A lower surface 68 of the head 40 is exposed downward, and faces the platen 42. The head 38 is provided with a plurality of nozzles 39, an ink channel 37 and a piezoelectric element 45 (see FIG. 4).

The plurality of nozzles 39 are opened in the lower surface 68 of the head 38. The ink channel 37 connects or links the tank 80 and the plurality of nozzles 39. The piezoelectric element 45 (see FIG. 4) deforms a part of the ink channel 37 to thereby cause a droplet of an ink (ink droplet) to be discharged or ejected downward from each of the plurality of nozzle 39. The piezoelectric element 45 is driven or activated by an electric supply from the controller 130 (see FIG. 4). In such a manner, the head 38 has the plurality of nozzles 39 which discharge or eject an ink (an example of a "liquid").

The tank 80 is supported by the carriage 40 in a state that the tank 80 is installed in the carriage 40. The tank 80 has an internal space 81. An ink 99 is stored in the internal space 81. In the present embodiment, the recording part 24 is provided one tank 80. An ink 99 of the black color (black ink) is stored in this one tank 80. Note that the color of the ink 99 stored in the tank 80 is not limited to the black color.

The tank 80 is positioned above the head 38. Note that in the present embodiment, although the entirety of the tank 80 is located above the head 38, it is also allowable that a part of the tank 80 is located above the head 38, and another part, of the tank 80, which is different from the part is located at a height equal to or lower than the height of the head 38. The internal space 81 of the tank 80 is communicated with the plurality of nozzle 39 via the ink channel 37. With this, the ink 99 is supplied from the internal space 81 to the plurality of nozzles 39.

An inlet port 83 via which the ink 99 is poured or supplied to the internal space 81 is provided in the upper wall 82 of the tank 80. The inlet port 83 penetrates the upper wall 82 in a thickness direction thereof so as to communicate the internal space 81 with the outside of the tank 80. A projected wall 84 (see FIG. 3) is provided in a surrounding of the inlet port 83 in the upper wall 82. A lid 85 is fitted to the projected wall 84, thereby closing the inlet port 83. In a case that the lid 85 is removed or detached from the projected wall 84, the inlet port 83 is exposed to the outside. In this state, a bottle (not depicted in the drawings) is inserted into the inlet port 83, and the ink 99 is poured from the bottle into the internal space 81 via the inlet port 83. Note that the inlet port 83 may be provided at another position which is different from the upper wall 82, provided that at the another position, an upper part of the internal space 81 is allowed to communicate with the outside.

Figure 3:
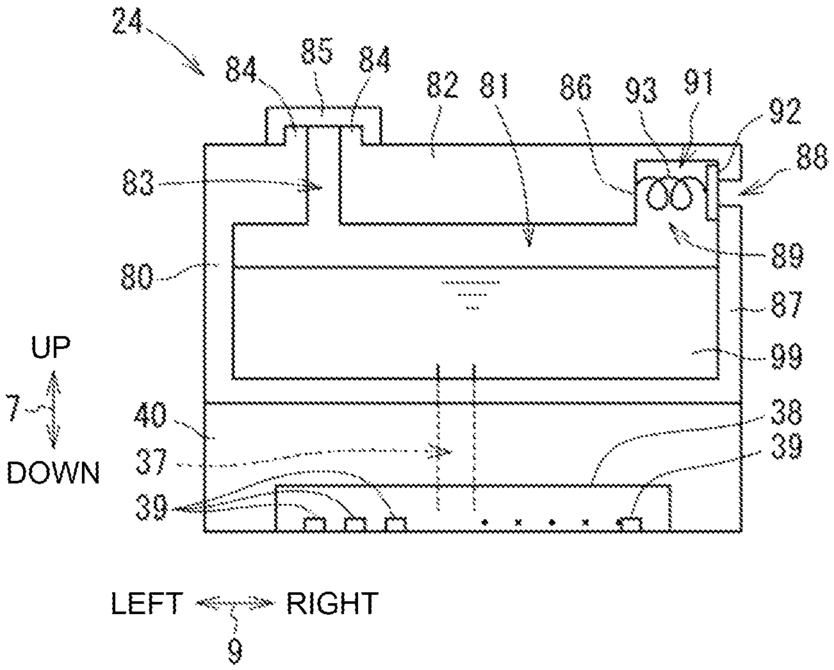
FIG. 3 is a cross-sectional view depicting a cross section of a recording part 24 as being cut by a plane orthogonal to a front-rear direction 8.

As depicted in FIG. 3, an atmosphere opening port 88 which is opened to the outside of the tank 80 is arranged at an upper part of a side wall 87 of the tank 80. In the internal space 81 of the tank 80, air enters into a part, of the internal space 81, in which the ink 99 is not present. The part, of the internal space 81 of the tank 80, into which the air enters is referred to as a gas layer. A gas channel 89 which passes the atmosphere opening port 88 is formed between the gas layer of the tank 80 and the outside thereof. The gas channel 89 communicates the gas layer of the tank 80 with the outside, via the atmosphere opening port 88 which is opened to the outside.

A valve unit 91 configured to open (release) or close the atmosphere opening port 88 is provided on the tank 80. The valve unit 91 is provided with a valve 92 and a coil spring 93. The valve 92 is a member configured to make contact with or to separate from the atmosphere opening port 88. The coil spring 93 is a member configured to urge the valve 92 rightward so as to bring the valve 92 into contact with the atmosphere opening port 88. A side surface 86 facing or opposite to the side wall 87 is formed at a location, inside the tank 80, corresponding to the coil spring 93. A left end of the coil spring 93 is connected to the side surface 86, and a right end of the coil spring 93 is connected to valve 92.

[Rotary Encoder 75]

The rotary encoder 75 depicted in FIG. 4 has an encoder disk which is provided on a shaft of the conveying motor 101 (see FIG. 4) and which is configured to rotate together with the conveying motor 101, and an optical sensor. A pattern, in which transmitting parts each configured to allow a light to transmit therethrough and non-transmitting parts each configured not to allow the light transmit therethrough are alternately arranged at an equal pitch therebetween in a circumferential direction of the encoder disk, is formed in the encoder disk. In a case that the encoder disk rotates, a pulse signal is generated each time the transmitting part and the non-transmitting part are detected by the optical sensor. The generated pulse signal is outputted to the controller 130 (see FIG. 4). The controller 130 calculates a rotating amount of the conveying motor 101 based on the pulse signal. Note that the rotary encoder 75 may be provided on a location which is different from the conveying motor 101, for example, on the feeding motor 102, the conveying roller 60, etc.

[Controller 130 and Memory 140]

In the following, the configurations of the controller 130 and the memory 140 will be explained, with reference to FIG. 4. The controller 130 is configured to control the entire operation of the multifunction peripheral 10. The controller 130 is provided with a CPU 131 and an ASIC 135. The memory 140 is provided with a ROM 132, a RAM 133 and an EEPROM 134. The CPU 131, the ASIC 135, the ROM 132, the RAM 133 and the EEPROM 134 are connected to one another by an internal bus 137.

The ROM 132 stores therein a program for causing the CPU 131 to control a variety of kinds of operations, etc. The RAM 133 is used as a storage area temporarily storing data and/or a signal to be used in a case that the CPU 131 executes the program, or as a working area for data processing. The EEPROM 134 stores a setting and/or a flag to be held or stored even after the power source is switched off.

The conveying motor 101, the feeding motor 102 and the carriage driving motor 103 are connected to the ASIC 135. Driving circuits each of which controls one of the respective motors are installed in the ASIC 135. The CPU 131 outputs driving signals each of which is for rotating one of the respective motors to one of the driving circuits corresponding to one of the respective motors. Each of the driving circuits outputs a driving voltage, in accordance with the driving signal obtained from the CPU 131, to one of the motors corresponding thereto. With this, the corresponding motor is rotated. Namely, the controller 130 controls the feeding motor 102 to cause the feeding part 16 to convey the sheet 12. Further, the controller 130 controls the conveying motor 101 to cause the conveying roller pair 59 and the discharging roller pair 44 to convey the sheet 12. Furthermore, the controller 130 drives the carriage driving motor 103 to move the carriage 40.

Moreover, the optical sensor of the rotary encoder 75 is connected to the ASIC 135. The controller 130 calculates the rotating amount of the conveying motor 101 based on the electric signal received from the optical sensor of the rotary encoder 75. Further, the encoder 35 is connected to the ASIC 135. The controller 130 recognizes the position of the carriage 40 and/or the presence or absence of the movement of the carriage 40, based on the pulse signal received from the encoder 35.

Further, the piezoelectric element 45 is connected to the ASIC 135. The piezoelectric element 45 is driven or activated by the electric supply from the controller 130 via a non-illustrated drive circuit. The controller 130 controls the electric supply to the piezoelectric element 45 so as to selectively discharge or eject an ink droplet from the plurality of nozzles 39. Furthermore, a state sensor (not depicted in the drawings) is connected to the ASIC 135. The controller 130 performs an image recording processing, an abnormality (handling) processing, etc., which will be described later on, based on a signal received from the state sensor.

In a case that the controller 130 performs recording of an image on the sheet 12, the controller 130 alternately executes a conveying processing and a printing processing. The conveying processing is a processing of causing the conveying roller pair 59 and the discharging roller pair 44 to convey the sheet 12 only by a predetermined line feed amount. The controller 130 controls the conveying motor 101 to thereby cause the conveying roller pair 59 and the discharging roller pair 44 to execute the conveying processing. The printing processing is a processing of controlling the electric supply to the piezoelectric element 45 while moving the carriage 40 along the left-right direction 9 to thereby cause the head 38 to discharge the ink droplets from the nozzles 39. During the printing processing, the carriage 40 is positioned in the medium passing area (an area between the right end and the left end of the platen 42), and faces or is opposite to the platen 42.

During a period of time (time interval) between the conveying processing which is currently being executed (current conveying processing) and the conveying processing which is to be executed next (a next conveying processing), the controller 130 stops the sheet 12 for a predetermined period of time. Further, the controller 130 executes the printing processing during the period of time for which the sheet 12 is stopped. Namely, in the printing processing, the controller 130 executes one pass for causing the ink droplets to be discharged from the nozzles 39 while causing the carriage 40 to move leftward or rightward. With this, an image recording for the one pass is executed with respect to the sheet 12.

The controller 130 is capable of performing image recording on an entire area, of the sheet 12, in which an image is recordable, by alternately and repeatedly executing the conveying processing and the printing processing. Namely, the controller 130 records an image on one piece of the sheet 12 with a plurality of passes.

Note that the controller 130 is not limited to or restricted by the controller 130 as described above. The controller 130 may be configured such that only the CPU 131 performs the various kinds of processing or that only the ASIC 135 performs the various kinds of processing, or that the CPU 131 and the ASIC 135 perform the various kinds of processing in a cooperative manner. Alternatively, the controller

130 may be configured such that one CPU 131 singly performs the processing, or that a plurality of pieces of the CPU 131 perform the processing in a sharing manner. Still alternatively, the controller 130 may be configured such that one ASIC 135 singly performs the processing, or that a plurality of pieces of the ASIC 135 perform the processing in a sharing manner.

[Operation of Valve Unit 91]

The valve unit 91 changes a state thereof between a close state in which the valve unit 91 closes or blocks the atmosphere opening port 88 and an open state in which the valve unit 91 opens or releases the atmosphere opening port 88. The carriage 40 moves to a pressure releasing position which is set at the outside of the medium passing area, in accordance with a control from the controller 130. In the present embodiment, the pressure releasing position is a position on the right side with respect to the medium passing area. In a case that the carriage 40 is inside the medium passing area, the valve unit is in the close state. In a case that the carriage 40 is at the pressure releasing position, the valve unit is in the open state.

Figure 5A:
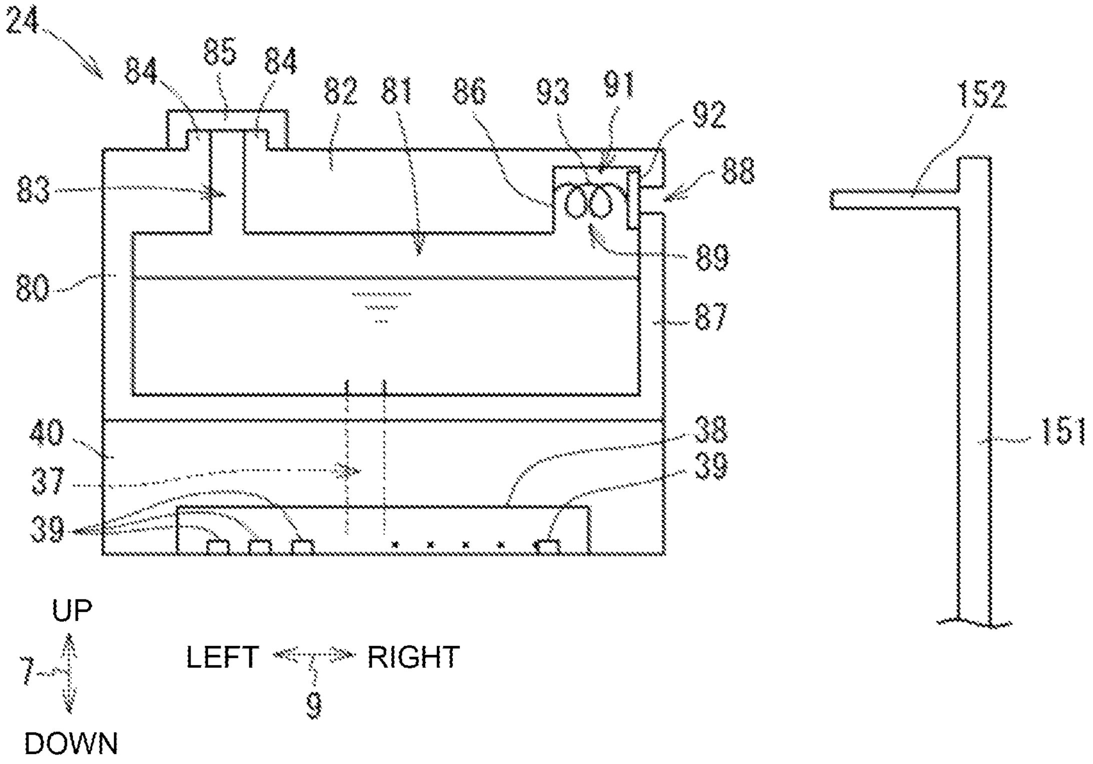

A frame 151 as depicted in FIG. 5A is a member expanding in the up-down direction 7 and the front-rear direction 8 (not depicted in the drawing). A contacting part 152 is a stick-like or bar-like member projecting from the frame 151 and extending in the left-right direction 9. The positions in the up-down direction 7 and the front-rear direction 8 of the contacting part 152 are same as the positions in the up-down direction 7 and the front-rear direction 8 of the atmosphere opening port 88. The outer diameter of the contacting part 152 is smaller than the inner diameter of the atmosphere opening port 88.

As depicted in FIG. 5A, during a period of time in which an image recording is performed, the carriage 40 moves in the left-right direction 9, at a position separated from the frame 151 and the contacting part 152. In this situation, the coil spring 93 urges the valve 92 rightward so as to bring the valve 92 into contact with the atmosphere opening port 88. Accordingly, the valve unit 91 is in the close state of closing the atmosphere opening port 88.

Figure 5B:
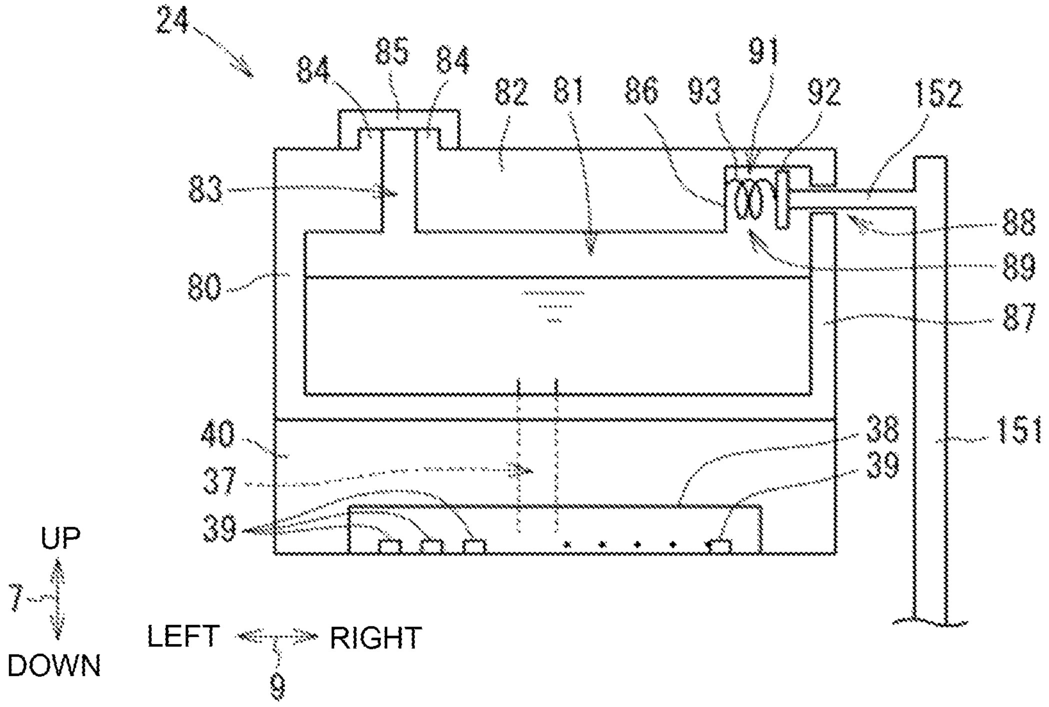

On the other hand, as depicted in FIG. 5B, in a case that the carriage 40 is moved to the pressure releasing position, the contacting part 152 penetrates the atmosphere opening port 88 from the right side, and presses the valve 92 leftward. In this situation, the valve 92 moves leftward against the urging force of the coil spring 93, and thus is separated from the atmosphere opening port 88. Accordingly, the valve unit 91 is in the open state of opening the atmosphere opening port 88. In a case that the valve unit 91 is in the open state, the pressure of the gas layer of the tank 80 is equal to the atmospheric pressure.

In a case that the image recording is executed again or resumed, the carriage 40 is separated from the frame 151 and the contacting part 152. In this situation, the valve 92 moves rightward by the urging force of the coil spring 93, and is brought into contact with the atmosphere opening port 88. Accordingly, the valve unit 91 is in the close state again.

[Image Recording Control and Pressure Releasing Control by Controller 130]

In the printer part 11 configured as described above, the controller 130 executes image recording control by which the sheet 12 is conveyed and an image is recorded on the conveyed sheet 12. In addition to this, the controller 130 executes pressure releasing control by which the valve unit 91 is made to be in the open state (the valve unit 91 opens or releases the atmosphere opening port 88) at a required timing.

In order to perform the pressure releasing control, the controller 130 counts a count value. The count value indicates an amount of the ink discharged or ejected from the nozzles 39 during a period of time in which the valve unit 91 is in the close state. The memory 140 stores an opening threshold value ΔV relating to the count value. The opening threshold value ΔV is stored, for example, in the RAM 133 in the memory 140. Under a condition that the count value has reached the opening threshold value ΔV, the controller 130 makes the valve unit 91 to be in the open state.

Figure 6A:
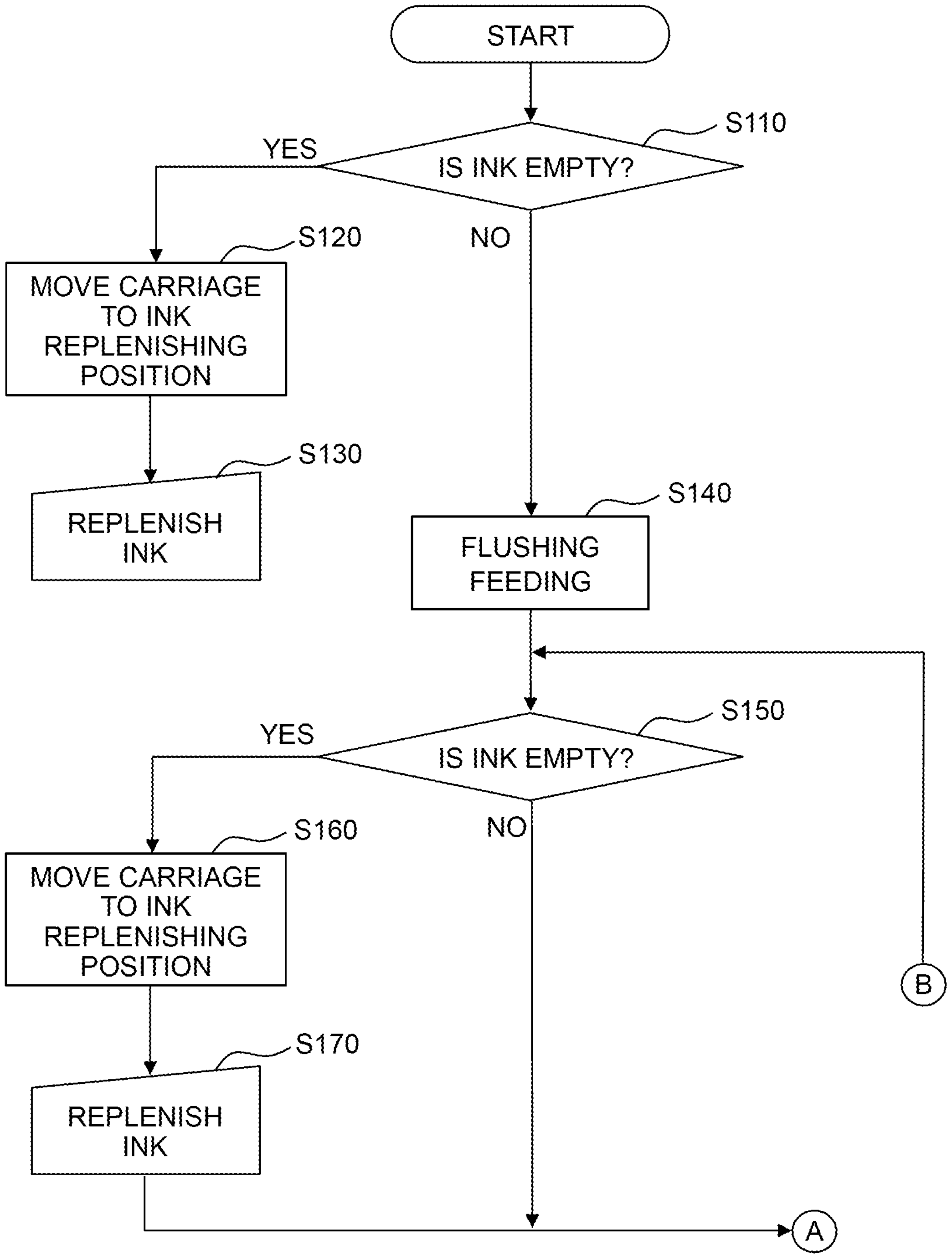
FIG. 6A and FIG. 6B indicate a flowchart for explaining image recording control and pressure releasing control by a controller 130.
Figure 6B:
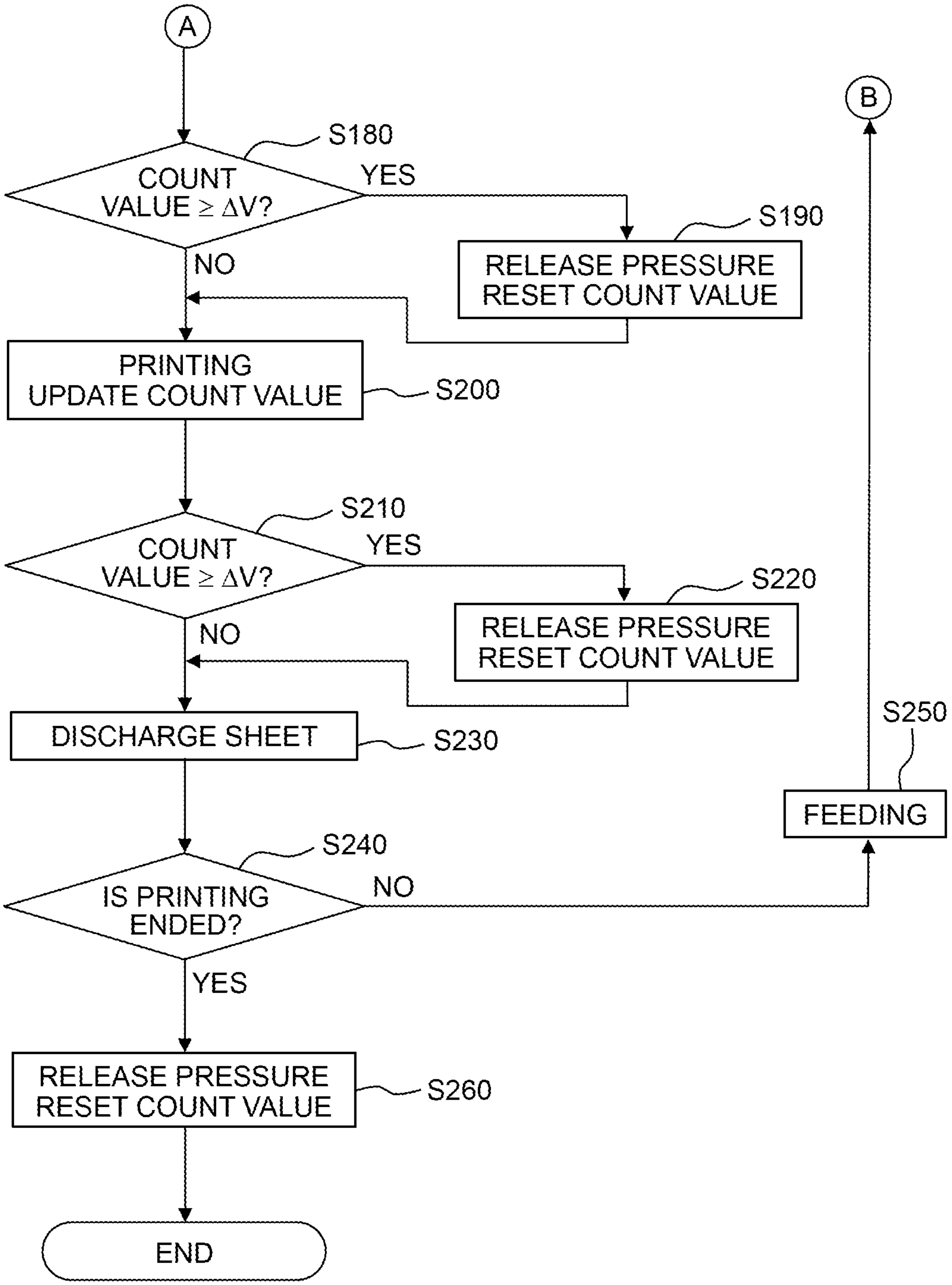

In the following, the image recording control and the pressure releasing control by the controller 130 will be explained, with reference to a flowchart indicated in FIGS. 6A and 6B. In a case that the controller 130 obtains a print command, the controller 130 performs the control indicated in FIGS. 6A and 6B. The print command is transmitted, to the controller 130, from the operating part 17 (see FIG. 1) of the multifunction peripheral 10 and/or an external apparatus or device connected to the multifunction peripheral 10, etc. The print command includes a command of starting the image recording control, information regarding the size of the sheet 12, and print data of image recording to be performed on the sheet 12. At a point of time that the controller 130 obtains the print command, the valve unit 91 is in the close state.

At first, the controller 130 determines whether or not the ink is empty (step S110). In the processing of step S110, the controller 130 uses an arbitrary method so as to determine whether or not the ink 99 stored in the tank 80 is empty. The controller 130 may determine whether or not the ink is empty by using, for example, a method of detecting a position of a float (not depicted in the drawings) provided in the inside of the tank 80, or a method of detecting a light reflected off a prism (not depicted in the drawings) provided on the inside of the tank 80. An amount of the ink 99 by which the ink is determined to be empty is previously determined. It is allowable, for example, that the controller 130 determines that the ink is empty in a case that the controller 130 determines that the ink 99 is completely empty, or that the controller 130 determines that the ink is empty in a case that the controller 130 determines that the amount of the ink 99 is less than a predetermined amount.

Under a condition that the ink is determined to be empty in the processing of step S110 (step S110: YES), the controller 130 drives the carriage driving motor 103 so as to move the carriage 40 to an ink replenishing position (step S120). While the carriage 40 is at the ink replenishing position, the ink is replenished (step S130). In step S130, the lid 85 is removed from the projected wall 84, and the ink 99 is poured from a bottle (not depicted in the drawings) into the internal space 81 via the inlet port 83. It is allowable that the ink replenishing position is same as the pressure releasing position, or is different from the pressure releasing position. Under a condition that the ink is not determined to be empty in the processing step S110 (step S110: NO), the controller 130 proceeds to the processing of step S140, without executing the processings of steps S120 and S130.

Next, the controller 130 performs flushing of the nozzles 39 and feeding of the sheet 12 (step S140). The controller 130 performs the flushing of the nozzles 39 by controlling the carriage driving motor 103 so as to move the carriage 40 to a flushing position and then by controlling the piezoelectric element 45. The controller 130 performs the feeding of the sheet 12 by controlling the feeding motor 102. The flushing of the nozzles 39 and the feeding of the sheet 12 are executed in parallel.

Next, the controller 130 determines again whether or not the ink is empty (step S150). Under a condition that the ink is determined to be empty in the processing of step S150 (step S150: YES), the controller 130 drives the carriage driving motor 103 so as to move the carriage 40 to the ink replenishing position (step S160). While the carriage 40 is at the ink replenishing position, the ink is replenished (step S170). The processings of step S160 and step S170 are same as the processings of step S120 and step S130, respectively. Under a condition that the ink is not determined to be empty in the processing of step S150 (step S150: NO), the controller 130 proceeds to the processing of step S180, without executing the processings of steps S160 and S170. Note that the reason for executing the processing of step S150 is that, even in a case that the ink is not determined to be empty in the processing of step S110, the ink becomes to be empty, in some cases, by the flushing performed in the processing of step S140.

Next, the controller 130 determines whether or not the count value is not less than the opening threshold value ΔV (step S180). The processing of step S180 is an example of a processing of determining as to whether or not the count value has reached the opening threshold value ΔV. Under a condition that the count value is determined to be not less than the opening threshold value ΔV in the processing of step S180 (step S180: YES), the controller 130 performs the pressure releasing, and resets the count value to an initial value (step S190). Under a condition that the count value is determined to be less than the opening threshold value ΔV in the processing of step S180 (step S180: NO), the controller 130 proceeds to the processing of step S200, without executing the processing of step S190.

In the processing of step S190, the controller 130 controls the carriage driving motor 103 so as to move the carriage 40 to the pressure releasing position. In a case that the carriage 40 is moved to the pressure releasing position, the valve unit 91 is in the open state in which the valve unit 91 opens the atmosphere opening port 88, thereby making the pressure of the tank 80 to be equal to the atmospheric pressure. The pressure releasing is performed under a condition that the ink is not discharged from the nozzles 39 while the carriage 40 is at the pressure releasing position. After the pressure releasing, the controller 130 controls the carriage driving motor 103 so as to move the carriage 40 to the original position thereof. In parallel with the pressure releasing, the controller 130 resets the count value to the initial value. The initial value of the count value is, for example, 0 (zero).

Next, the controller 130 updates the count value while performing the printing (step S200). In the processing of step S200, the controller 130 performs recording of an image with respect to one piece of the sheet 12. The controller 130 records an image on the entire area, of the sheet 12, in which the image is recordable, by alternately and repeatedly executing the conveying processing and the printing processing. The controller 130 calculates an ink amount of the ink discharged from the nozzles 39 in a case of performing image recording on one piece of the sheet 12, based on, for example, the print data. The controller 130 adds this ink amount to the count value.

Next, the controller 130 determines whether or not the count value is not less than the opening threshold value ΔV (step S210). Similarly to the processing of step S180, the processing of step S210 is a processing of determining whether the count value has reached the opening threshold value ΔV. Under a condition that the count value is determined to be not less than the opening threshold value ΔV in the processing of step S210 (step S210: YES), the controller 130 performs the pressure releasing, and resets the count value to the initial value (step S220). The processing of step S220 is same as the processing of step S190. Under a condition that the count value is determined to be less than the opening threshold value ΔV in step S210 (step S210: NO), the controller 130 proceeds to the processing of step S230, without performing the processing of step S220.

Next, the controller 130 performs discharging of the sheet 12 (step S230). In the processing of step S230, the controller 130 causes the conveying roller pair 59 and the discharging roller pair 49 to convey the sheet 12 in the conveying orientation 15, and to discharge the sheet 12 to the discharge tray 12.

Next, the controller 130 determines whether or not the printing is ended (step S240). In the processing of step S240, the controller 130 determines whether or not the image data included in the print command has been all recorded on the sheet 12.

Under a condition that the controller 130 determines that the printing is not ended (step S240: NO), the controller 130 performs the feeding of the sheet 12 (step S250). The processing of step S250 is same as the feeding in the processing of step S140. Afterwards, the controller 130 proceeds to the processing of step S150. Note that the feeding of a subsequent sheet 12 may be performed in parallel to the discharge of a preceding sheet 12 (step S230).

Under a condition that the controller 130 determines that the printing is ended in the processing of step S240 (step S240: YES), the controller 130 performs the pressure releasing and resets the count value to the initial value (step S260). The processing of step S260 is same as the processing of step S190 and the processing of step S220. With this, the controller 130 ends the image recording control and the pressure releasing control.

As described above, the controller 130 counts the count value which indicates the amount of the ink discharged from the nozzle 39 during a period of time in which the valve unit 91 is in the close state. Under the condition that the count value has reached the opening threshold value ΔV, the controller 130 makes the valve unit 91 to be in the open state. In steps S190, S220 and S260, the controller 130 resets the count value to the initial value after the controller 130 has made the valve unit 91 to be in the open state. Under the condition that the ink is not discharged from the nozzles 39, the controller 130 makes the valve unit 91 to be in the open state.

Note that although the explanation has been made here regarding the case that the controller 130 performs the image recording normally, it is allowable that the controller 130 executes a processing of detecting an abnormality and a processing to be performed in a case that any abnormality is detected (each of which is not depicted in the drawings), while performing the image recording.

[Opening Threshold Vale ΔV]

In the following, the opening threshold value ΔV used in the pressure releasing control will be explained. Provided that the volume of the tank 80 is "Vtmax", the maximum amount of the ink storable in the tank 80 is "Vi", the atmospheric pressure is "P", and a meniscus-withstanding pressure of the ink formed in the nozzle 39 is "Pm", the opening threshold value ΔV satisfies the following expression (1).

$$\Delta V \leq (Vt\max - Vi) \times Pm/(P - Pm) \qquad \text{expression (1)}$$

Figure 7A:
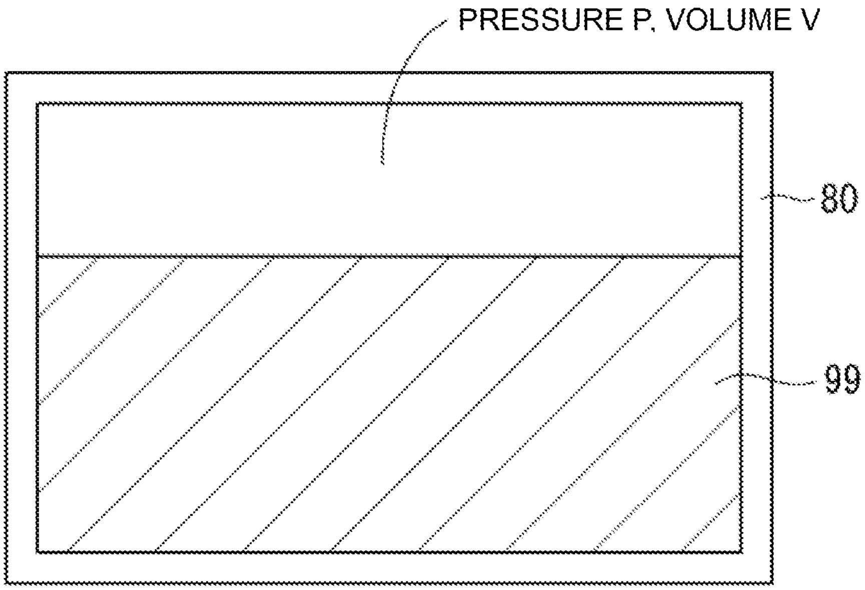
Figure 7B:
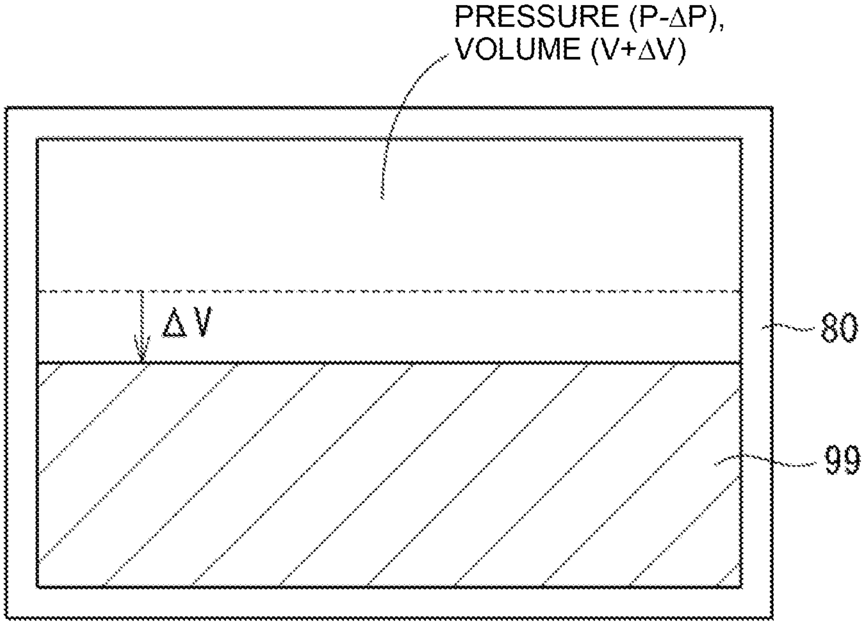

The process of deriving the expression (1) will be explained, with reference to FIGS. 7A and 7B. A state of the gas layer of the tank 80 in a case that the valve unit 91 is in the close state is schematically depicted in FIGS. 7A and 7B. A state of the gas layer before the image recording is depicted in FIG. 7A, and a state of the gas layer after the image recording is depicted in FIG. 7B. As depicted in FIGS. 7A and 7B, the ink 99 is stored in the tank 80 while forming a liquid surface. A height of a maximum amount of the ink 99 storable in the tank 80 is located above the opening of the nozzle 39.

As depicted in FIG. 7A, provided that before the image recording, the pressure of the gas layer of the tank 80 is the atmospheric pressure P, and the volume of the gas layer of the tank 80 is V. Provided that in the state depicted in FIG. 7A, ΔV≤(ΔV is a positive value) of the ink 99 is discharged by the image recording, and that the state is changed to the state depicted in FIG. 7B. It is assumed that the tank 80 is a rigid body which is not deformed by the image recording, and that ΔV of the ink 99 is discharged, the volume of the gas layer of the tank 80 is increased only by ΔV and becomes to be (V+ΔV). Provided that a lowered amount of the pressure of the gas layer of the tank 80 at this time is ΔP (ΔP is a positive value), the following expression (2) holds.

$$PV=(P-\Delta P)(V+\Delta V) \qquad \text{expression (2)}$$

From the expression (2), the following expression (3) is derived.

$$\Delta P=P\times\Delta V/(V+\Delta V) \qquad \text{expression (3)}$$

In a case that the ink 99 stored in the tank 80 is reduced only by ΔV, and that the pressure releasing of the tank 80 is performed during a period of time that the variation (increase) in the pressure of the gas layer of the tank 80 is not more than the meniscus-withstanding pressure Pm, the meniscus of the ink formed in the nozzles 39 is maintained. On the other hand, the pressure of the gas layer of the tank 80 is changed more easily as the volume of the gas layer of the tank 80 is smaller. In other words, the pressure of the gas layer of the tank 80 is changed more easily as the amount of the ink 99 stored in the tank 80 is greater. Accordingly, in the case that the ink 99 is decreased only by ΔV, it is considered that the maintaining of the meniscus is hardest in a case that the maximum amount of the ink 99 storable in the tank 80 is stored in the tank 80.

Accordingly, in a case that ΔV in the expression (3) is made to be the opening threshold value ΔV used in the pressure releasing control, that the maximum amount of the ink 99 storable in the tank 80 is stored in the tank 80, and that the ΔP in the expression (3) is not more than the meniscus-withstanding pressure, the meniscus of the ink 99 formed in the nozzle 39 is maintained regardless of the amount of the ink 99 stored in the tank 80. In a case that the maximum amount of the ink 99 storable in the tank 80 is stored in the tank 80, V=Vtmax−Vi holds.

By solving an inequality that the result of substituting the above-described expression to the right side of the expression (3) is not more than Pm, the expression (1) is derived.

[Specific Example of Opening Threshold Value ΔV]

In the following, a specific example of the opening threshold value ΔV will be explained. In a case of evaluating the speed of a printer, etc., an ISO chart including four color images is used, in some cases. In a case that four color images included in the ISO chart are printed by using four color inks (magenta, yellow, cyan and black inks), the black ink is consumed most among the four color inks; an average value of the consumption amounts of the black ink per one image is 0.020 mL. In a case of adopting this value as an ink amount required for printing one image, an ink amount required for printing 200 images is 4.2 mL, and an ink amount required for printing 600 images is 12.5 mL.

Provided that the atmospheric pressure is assumed to be 101.3 kPa, and the meniscus-withstanding pressure of the meniscus of the ink 99 formed in the nozzle 39 is assumed to be 2.5 kPa. The volume of the gas layer of the tank 80 is changed as follows, depending on the opening threshold value ΔV. Under this assumption, in a case that the opening threshold value ΔV is made to be 0.2 mL, the volume of the gas layer becomes to be not less than 7.90 mL. Under the same assumption, in a case that the opening threshold value ΔV is made to be 0.3 mL, the volume of the gas layer becomes to be not less than 11.85 mL. Under the same assumption, in a case that the opening threshold value ΔV is made to be 0.4 mL, the volume of the gas layer becomes to be not less than 15.82 mL. Under the same assumption, in a case that the opening threshold value ΔV is made to be 0.5 mL, the volume of the gas layer becomes to be not less than 19.75 mL. Under the same assumption, in a case that the opening threshold value ΔV is made to be 0.6 mL, the volume of the gas layer becomes to be not less than 23.70 mL.

Provided that the number of sheet on which the printing is to be performed is 200 (corresponding to the ink amount of 4.2 mL) and that the opening threshold value ΔV is made to be 0.2 mL, the volume of the tank 80 satisfying the expression (1) is not more than 12.07 mL. With the same number of sheet, in a case that the opening threshold value ΔV is made to be 0.3 mL, the volume of the tank 80 satisfying the expression (1) is not more than 16.02 mL. With the same number of sheet, in a case that the opening threshold value ΔV is made to be 0.4 mL, the volume of the tank 80 satisfying the expression (1) is not more than 19.99 mL. With the same number of sheet, in a case that the opening threshold value ΔV is made to be 0.5 mL, the volume of the tank 80 satisfying the expression (1) is not more than 23.92 mL. With the same number of sheet, in a case that the opening threshold value ΔV is made to be 0.6 mL, the volume of the tank 80 satisfying the expression (1) is not more than 27.87 mL.

Provided that the number of sheet on which the printing is to be performed is 600 (corresponding to the ink amount of 12.5 mL) and that the opening threshold value ΔV is made to be 0.2 mL, the volume of the tank 80 satisfying the expression (1) is not more than 20.40 mL. With the same number of sheet, in a case that the opening threshold value ΔV is made to be 0.3 mL, the volume of the tank 80 satisfying the expression (1) is not more than 24.35 mL. With the same number of sheet, in a case that the opening threshold value ΔV is made to be 0.4 mL, the volume of the tank 80 satisfying the expression (1) is not more than 28.32 mL. With the same number of sheet, in a case that the opening threshold value ΔV is made to be 0.5 mL, the volume of the tank 80 satisfying the expression (1) is not more than 32.25 mL. With the same number of sheet, in a case that the opening threshold value ΔV is made to be 0.6 mL, the volume of the tank 80 satisfying the expression (1) is not more than 36.20 mL.

It is allowable that the multifunction peripheral 10 does not perform the pressure releasing of the tank 80 until the evaluation of the speed using the ISO chart is completed. For example, in a case that the printing speed is 6 ipm (Image Per Minute: a number of sheet or image which can be output per one minute), in the evaluation of the speed using the ISO chart, the four color images included in one copy are sequentially printed and then the image (here, four color images) included in a copy of which number is minimum and of which printing time exceeds 30 seconds is printed; thus, eight images in total are printed. An ink amount required for printing the eight images is 0.16 mL. Considering this point, the opening threshold value ΔV is made to be not less than 0.16 mL.

Further, in order to make the size of the multifunction peripheral 10 be small, it is necessary to make the size of the tank 80 be small, as well. Considering the size of the multifunction peripheral 10, the volume Vtmax of the tank 80 is made to be not more than 25 mL.

Figure 8A:
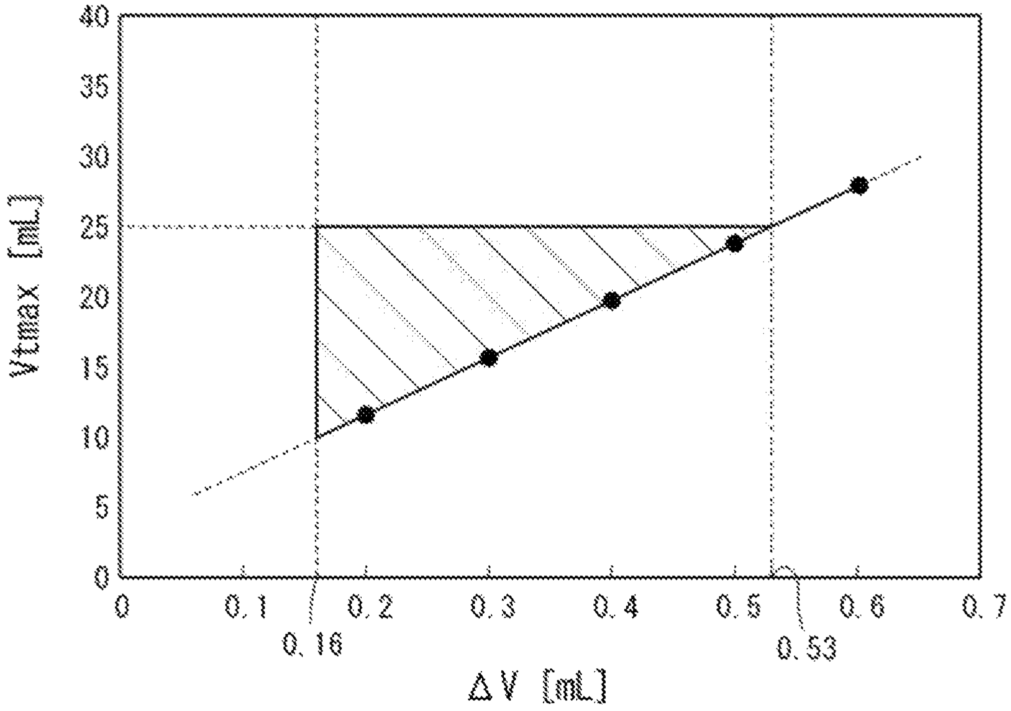

Provided that the number of sheet on which the printing is to be performed is 200 (corresponding to the ink amount of 4.2 mL), the range of the opening threshold value ΔV and the volume Vtmax wherein ΔV is not less than 0.16 mL and Vtmax is not more than 25 mL and wherein the expression (1) is satisfied is a range indicated by oblique lines in FIG. 8A. In the range indicated by the oblique lines in FIG. 8A, the opening threshold value ΔV is not more than 0.53 mL. Accordingly, in a case that the volume Vtmax of the tank 80 is not more than 25 mL and the maximum amount Vi of the ink 99 storable in the tank 80 is not more than 4.2 mL, the opening threshold value ΔV is made to be not more than 0.53 mL.

Figure 8B:
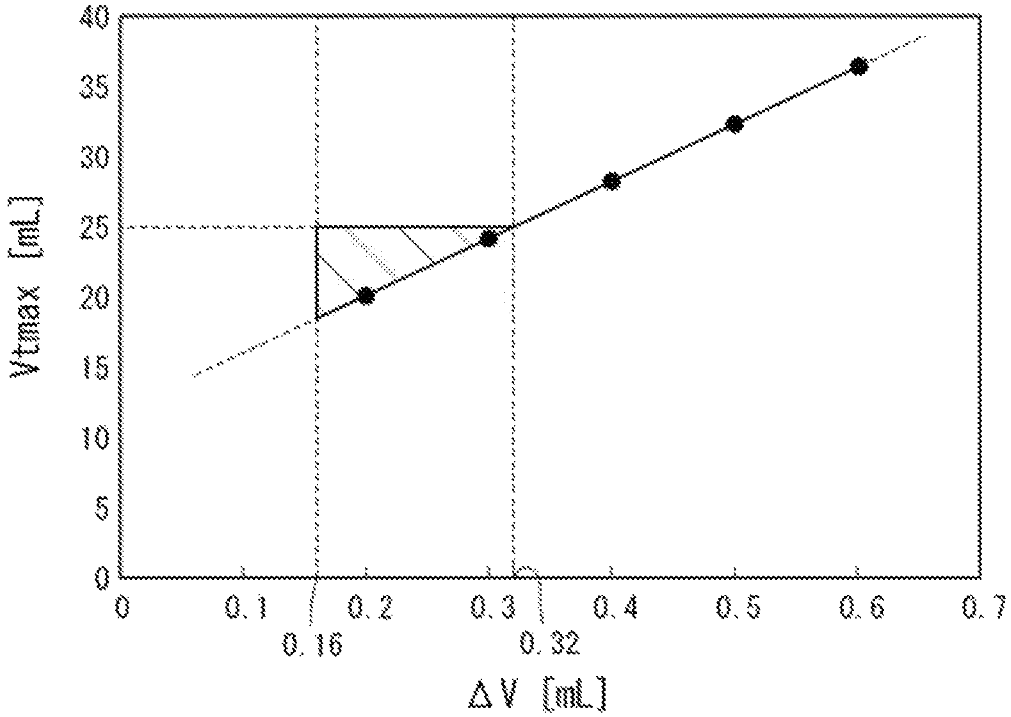

Provided that the number of sheet on which the printing is to be performed is 600 (corresponding to the ink amount of 12.5 mL), the range of the opening threshold value ΔV and the volume Vtmax wherein ΔV is not less than 0.16 mL and Vtmax is not more than 25 mL and wherein the expression (1) is satisfied is a range indicated by oblique lines in FIG. 8B. In the range indicated by the oblique lines in FIG. 8B, the opening threshold value ΔV is not more than 0.32 mL. Accordingly, in a case that the volume Vtmax of the tank 80 is not more than 25 mL and the maximum amount Vi of the ink 99 storable in the tank 80 is not more than 12.5 mL, the opening threshold value ΔV is made to be not more than 0.32 mL.

[Control of Opening Threshold Value ΔV According to Ink Remaining Amount]

In a case that the opening threshold value ΔV is made to be a small value within the range satisfying the expression (1), it is possible to maintain the pressure of the gas layer of the tank 80 within a suitable range, and to discharge the ink 99 stably from the nozzles 39. On the other hand, in a case that the opening threshold value ΔV is made to be a great value within the range satisfying the expression (1), it is possible to lower the frequency of performing the pressure releasing, and to make the printing speed to be high. Considering these points, it is allowable that the controller 130 resets the initial value of the count value to the initial value and then the controller 130 obtains the remaining amount of the ink stored in the tank 80, and changes the opening threshold value ΔV in accordance with the obtained ink remaining amount.

The controller 130 counts, in order to control the opening threshold value ΔV according to the ink remaining amount, another count value which is different from the above-described count value (hereinafter referred to as a "full count value"). The full count value indicates an amount of the ink 99 consumed since a point of time at which the maximum amount of the ink 99 has been stored in the tank 80 and until a certain point of time. The controller 130 counts the full count value based on the print data.

The memory 140 stores a table in which the full count value (or a range of the full count value) and the opening threshold value ΔV are associated with each other. In this table, as the full count value is smaller (namely, as the remaining amount of the ink 99 is greater), the opening threshold value ΔV of which value is smaller is stored. After the controller 130 resets the count value to the initial value in each of steps S190, S220 and S260 indicated in FIG. 6B, the controller 130 reads out an opening threshold value ΔV corresponding to the full count value of the certain point of time, and uses the opening threshold value ΔV, which is read out, in the pressure releasing control to be performed at and after the certain point of time. The full count value can be associated with the remaining amount of the ink 99 stored in the tank 80. By such a method, the controller 130 obtains the remaining amount of the ink 99 stored in the tank 80, and changes the opening threshold value ΔV in accordance with the obtained remaining amount of the ink 99.

In a case that the remaining amount of the ink 99 is large, the volume of the gas layer of the tank 80 is small. In a case that the ink 99 is discharged from the nozzles 39 in this state, the pressure of the gas layer of the tank 80 changes greatly. Accordingly, the pressure of the gas layer of the tank 80 easily deviates from a preferred range, which in turn makes it difficult to discharge the ink 99 stably from the nozzles 39. In view of this, in a case that the remaining amount of the ink 99 is large, a relatively small value is used as the opening threshold value ΔV. With this, it is possible to maintain the pressure of the gas layer of the tank 80 within the preferred range, and to discharge the ink 99 stably from the nozzles 39.

On the other hand, in a case that the remaining amount of the ink 99 is small, the volume of the gas layer of the tank 80 is great. Even if the ink 99 is discharged from the nozzles 39 in this state, the pressure of the gas layer of the tank 80 does not change greatly. Accordingly, the pressure of the gas layer of the tank 80 is unlikely to deviate from the preferred range, which in turn makes it possible to discharge the ink 99 stably from the nozzles 39. However, in a case that the opening threshold value ΔV is unnecessarily small, the frequency of performing the pressure releasing becomes great, which in turn lowers the printing speed. In view of this, a relatively great value is used as the opening threshold value ΔV in the case that the remaining amount of the ink 99 is small. With this, it is possible to lower the frequency of performing the pressure releasing and to prevent the printing speed from becoming lowered.

By changing the opening threshold value ΔV according to the remaining amount of the ink 99, the opening threshold value ΔV suitable for the remaining amount of the ink 99 in the tank 80 is set. With this, it is possible to discharge the ink 99 stably from the nozzles 39 and to prevent the printing speed from lowering.

Note that the controller 130 may obtain the remaining amount of the ink 99 stored in the tank 80 with a method different from the above-described method. For example, the controller 130 obtains the remaining amount of the ink 99 stored in the tank 80 by a method of detecting a position of a float (not depicted in the drawings) provided in the inside of the tank 80, or a method of detecting a light reflected off a prism (not depicted in the drawings) provided on the inside of the tank 80. The controller 130 may obtain the remaining amount of the ink 99 by using the same method as used in the processing of each of steps S110 and S150, or by using a method different from the method used in the processing of each of steps S110 and S150.

In this case, it is not necessary that the controller 130 obtains a precise value of the remaining amount of the ink 99; the controller 130 may obtain an approximate value of the remaining amount of the ink 99. For example, the controller 130 may obtain, as the remaining amount of the ink 99, a two-level value (a high level and a low level) or a three-level value (a high level, a middle level and a low level).

According to the above-described liquid discharge apparatus, since the pressure of the gas in the inside of the tank 80 is made to be the atmospheric pressure at an appropriate timing while making the volume of the tank 80 to be small, it is possible to discharge the liquid stably from the nozzles 39.

Further, the controller 130 resets the count value to the initial value after the controller 130 has made the valve unit 91 to be in the open state. With this, it is possible to make the valve unit 91 to be in the open state every time the count value reaches the opening threshold value ΔV.

Furthermore, the controller 130 obtains the remaining amount of the ink 99 stored in the tank 80 after the controller 130 has reset the count value to the initial value, and changes the opening threshold value ΔV according to the obtained remaining value. With this, the opening value ΔV, which is suitable for the remaining amount of the ink 99 stored in the tank 80 is thus set.

[Modifications]

Figure 9:
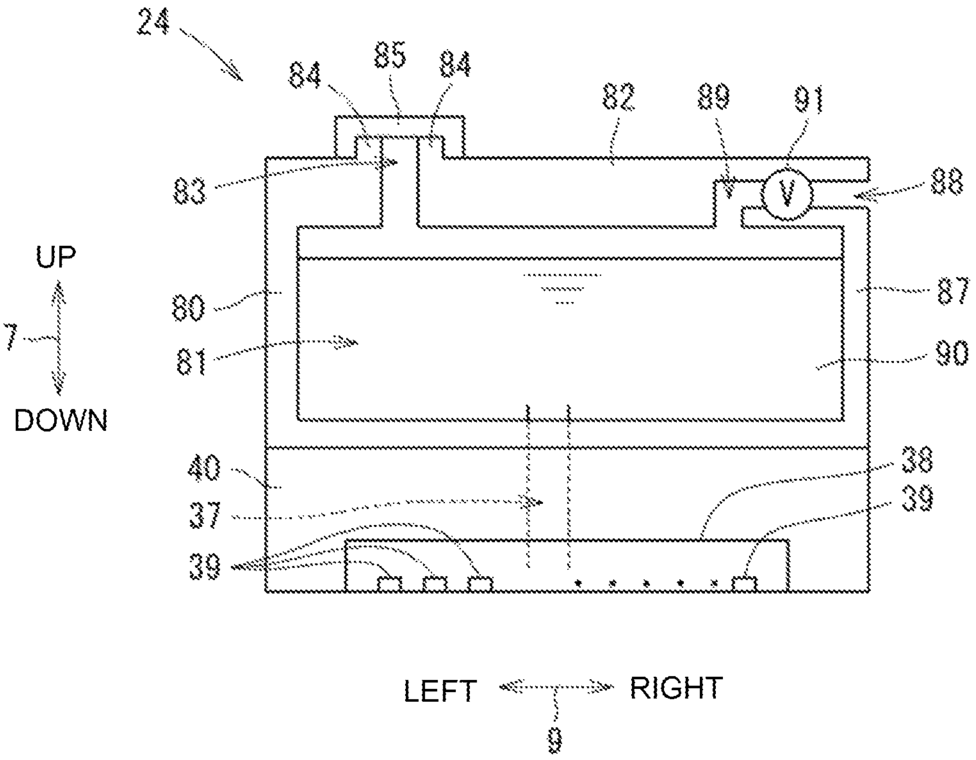
FIG. 9 is a vertical cross-sectional view depicting a cross section of a tank 80, as being cut by the plane orthogonal to the front-rear direction 8.

In the above-described embodiment, although the valve unit 91 is configured to open or close the atmosphere opening port 88, the valve unit 91 may be configured to open or close the gas channel 89. For example, in a tank 80 depicted in FIG. 9, the valve unit 91 is provided at an intermediate part of the gas channel 89, and opens or closes the gas channel 89, rather than the atmosphere opening port 88. In such a manner, the valve unit 91 may be configured to open or close the atmosphere opening port 88 or the gas channel 89.

Figure 10:
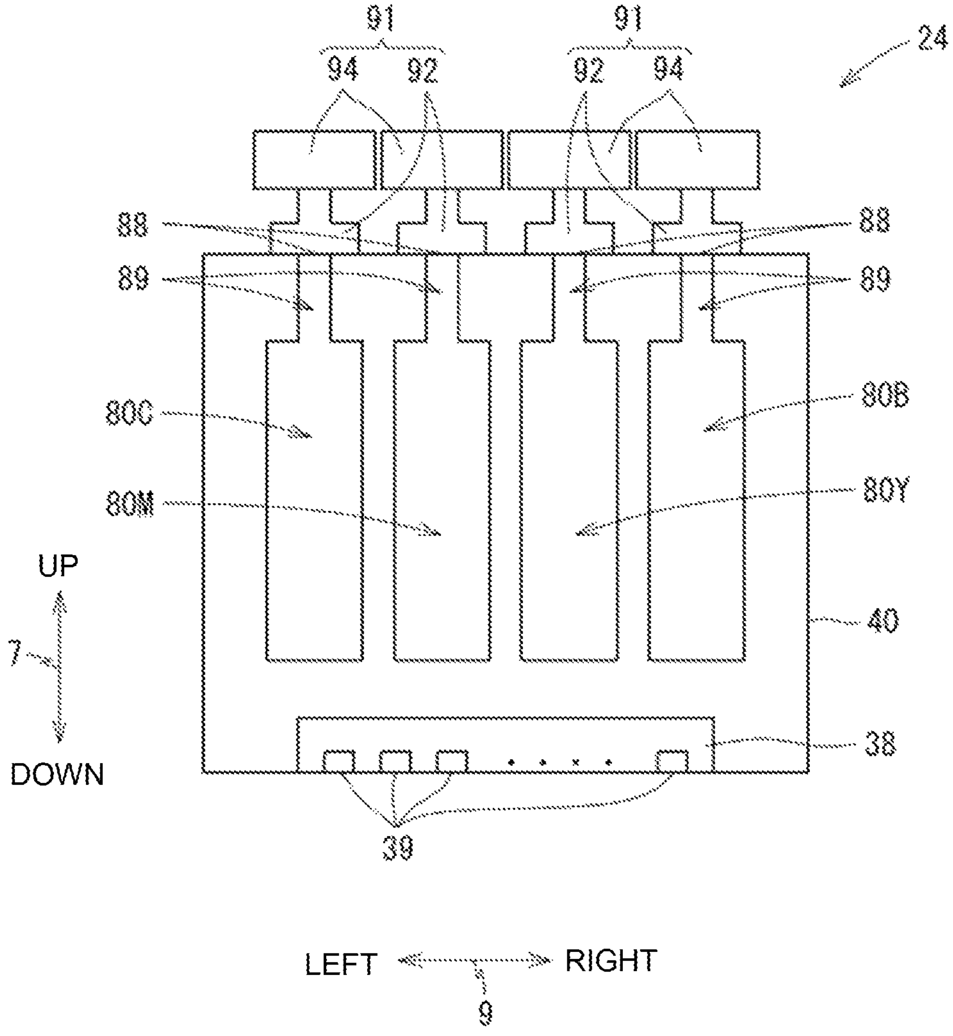
FIG. 10 is a vertical cross-sectional view depicting a cross section of a tank 80, as being cut by the plane orthogonal to the front-rear direction 8.

In the above-described embodiment, although only one piece of the tank 80 is provided on the recording part 24, it is allowable that a plurality of tanks 80 are provided on the recording part 24. For example, as depicted in FIG. 10, the recording part 24 may be provided with four tanks 80C, 80M, 80Y and 80B. Further, in the above-described embodiment, although the valve unit 91 changes the state thereof depending on the position of the carriage 40, it is allowable that the valve unit 91 may change the state thereof, regardless of the position of the carriage 40.

A cyan ink (not depicted in the drawings) is stored in the tank 80C. A magenta ink (not depicted in the drawings) is stored in the tank 80M. A yellow ink (not depicted in the drawings) is stored in the tank 80Y. A black ink (not depicted in the drawings) is stored in the tank 80B. The tanks 80C, 80M, 80Y and 80B are arranged side by side in the left-right direction 9. Note that the tanks 80C, 80M, 80Y and 80B may be arranged side by side in a direction different from the left-right direction 9, for example, in the front-right direction 8. Further, the order of arrangement of the tanks 80C, 80M, 80Y and 80B are not limited to the order depicted in FIG. 10. Furthermore, the sizes of the respective tanks 80C, 80M, 80Y and 80B may be same as one another or different from one another.

The atmosphere opening port 88 is provided on each of the tanks 80C, 80M, 80Y and 80B. The valve unit 91 is provided as valve units 91 corresponding to the atmosphere opening ports 88 of the respective tanks 80C, 80M, 80Y and 80B. Each of the valve units 91 is provided with a valve 92 and a solenoid 94. Each of the valves 92 is supported to be movable along the up-down direction 7 by the solenoid 94 corresponding thereto. Note that FIG. 10 depicts a situation in which the four valve units 91 are in the close state. Further note that in FIG. 10, the illustration of a member supporting the solenoid 94 is omitted. By the electric current supplied from the controller 130 to the four solenoids 94, each of the valves 92 independently approaches closely or is separated from the atmosphere opening port 88 located at an upper end of the gas channel 89. In a case that the valve 92 makes contact with the atmosphere opening port 88, the valve unit 91 corresponding thereto is to made be in the close state. In a case that the valve 92 is separated from the atmosphere opening port 88, the valve unit 91 corresponding thereto is made to be in the open state.

In the example depicted in FIG. 10, although the four valve units 91 are provided corresponding to the four atmosphere opening ports 88, respectively, it is allowable that one valve unit 91 is provided with respect to the four atmosphere opening ports 88. In such a case, the valve unit is provided with four valves 92 and one solenoid 94. By the electric current supplied from the controller 130 to the four solenoids 94, the four valves 92 simultaneously approach closely or are separated from the four atmosphere opening ports 88, respectively, each of which is located at an upper end of the gas channel 89.

In the above-described embodiment, the system by which the head 38 records an image on the sheet 12 is of the serial head type in which the head 38 records the image on the sheet 12 while the head 38 is being moved by the carriage 40. It is allowable, however, that the system by which the head 38 records an image on the sheet 12 is of a line head type in which the recording part 24 is not provided with the carriage 40 and the head 38 records the image on the sheet 12 without moving. In the case of the line head system, the head 38 is provided to span from the right end to the left end of the medium passing area. Further, the conveying operation and the printing operation are executed in parallel and in a continuous manner. Namely, the ink droplets are continuously discharged from the nozzles 39 while the sheet 12 is conveyed. Further, in the case of the line head type, the head 38 is supported by a frame of the casing 14. This frame corresponds to a "supporting member".

In the embodiment, the tank 80 is installed in the carriage 40, and the ink is replenished by pouring the ink from the inlet port 83. The tank 80, however, is not limited to such a configuration. For example, the tank 80 may be a cartridge which is attachable and detachable with respect to the carriage 40. In such a case, if the amount of the ink stored in the cartridge becomes small, or if the ink is used up, the cartridge is replaced by a new cartridge.

In the embodiment, although the tank 80 is supported by the carriage 40, it is allowable that the tank 80 is not supported by the carriage 40. For example, it is allowable that the tank 80 is arranged at a location, which is different from the carriage 40, in the multifunction peripheral 10. In such a case, the tank 80 and the head 38 are connected to each other by a tube, etc.; an ink stored in the tank 80 is supplied to the head 38 via the tube, etc. In this case also, at least a part of the tank 80 is located above the head 38.

What is claimed is:

1. A liquid discharge apparatus comprising:

a head having a nozzle;

a tank in which a height of a liquid surface, in a case that the tank stores a maximum amount of a liquid, is positioned above an opening of the nozzle;

a gas channel configured to communicate a gas layer of the tank with outside of the tank, via an atmosphere opening port which is opened to the outside;

a valve unit configured to open or close the atmosphere opening port or the gas channel;

a memory configured to store an opening threshold value ΔV; and a controller connected to the memory and configured to control the valve unit, wherein the controller is configured to execute:

counting of a count value indicating an amount of the liquid discharged from the nozzle in a case that the valve unit is in a close state in which the valve unit closes the atmosphere opening port or the gas channel; and making of the valve unit to be in an open state in which the valve unit opens the atmosphere opening port or the gas channel, under a condition that the count value has reached the opening threshold value ΔV, and wherein the opening threshold value ΔV is represented by $$\Delta V \leq (Vt\text{max} - VI) \times Pm/(P - Pm),$$

wherein Vtmax represents a volume of the tank, Vi represents the maximum amount of the liquid storable in the tank, P represents an atmospheric pressure, and Pm represents a meniscus-withstanding pressure of the liquid formed in the nozzle.

2. The liquid discharge apparatus according to claim 1, wherein the controller is configured to make the valve unit to be in the open state and then to reset the count value to an initial value.

3. The liquid discharge apparatus according to claim 2, wherein the controller is configured to reset the count value to the initial value, and then to obtain a remaining amount of the liquid stored in the tank and change the opening threshold value ΔV according to the obtained remaining amount.

4. The liquid discharge apparatus according to claim 1, wherein the controller is configured to make the valve unit to be in the open state under a condition that the liquid is not discharged from the nozzle.

5. The liquid discharge apparatus according to claim 1, wherein the Vtmax is not more than 25 mL, wherein the Vi is not more than 4.2 mL, and wherein the opening threshold value ΔV is not more than 0.53 mL.

6. The liquid discharge apparatus according to claim 1, wherein the Vtmax is not more than 25 mL, wherein the Vi is not more than 12.5 mL, and wherein the opening threshold value ΔV is not more than 0.32 mL.

7. The liquid discharge apparatus according to claim 5, wherein the opening threshold value ΔV is not less than 0.16 mL.

8. The liquid discharge apparatus according to claim 6, wherein the opening threshold value ΔV is not less than 0.16 mL.

* * * * *